Patented May 9, 1933

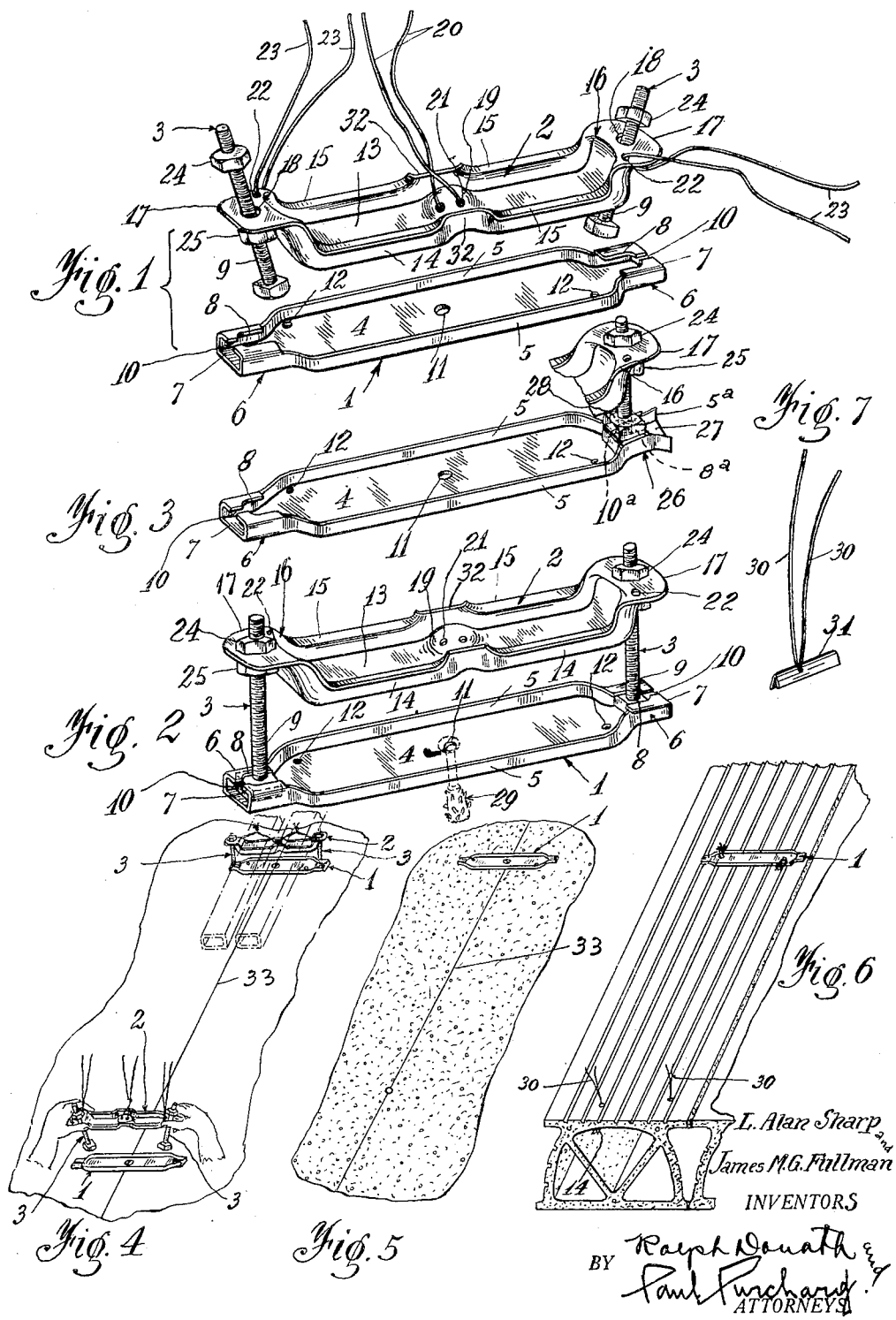

1,908,067

UNITED STATES PATENT OFFICE

L ALAN SHARP, OF AVALON, AND JAMES M. G. FULLMAN, OF SEWICKLEY, PENNSYLVANIA, ASSIGNORS TO NATIONAL ELECTRIC PRODUCTS CORPORATION, OF PITTSBURGH, PENNSYLVANIA, A CORPORATION OF DELAWARE

SUPPORT FOR DUCTS

Application filed December 14, 1928, Serial No. 326,036. Renewed August 12, 1931.

This invention relates to new and useful improvements in supports for ducts or conduits used in under floor or under partition duct systems for electrical distributions.

One of the objects of the invention is to provide a duct-support which is well suited for the present practice of progressive workmanship in which a group of workmen, called the "layout gang", may install the so called "base" of the support or any desired floor-base, before the top finish of the floor is applied, whereby the runs of the ducts are accurately defined and whereby the necessity of installing the ducts while working along a chalk line, or tight line, used for establishing the runs of the ducts is obviated.

It is a further object of the present invention to provide a construction of such character with bases of relatively short height so that the installation of such parts will produce little or no obstruction to workmen of any trade who may be employed on the building. However, the installed bases define the line of material and guard other trades against possible interference.

Another object is to provide a support whose upper part or saddle is separable from the base and which saddle may be readily engaged and fastened to the base at any time during the construction program.

A further object is to provide a support or saddle which will hold the duct in proper relation to the finished floor.

Another object is to provide a saddle which will accurately space and maintain spacing of ducts when the latter are installed.

Another object of this invention is to provide a duct-support which can be readily adjusted up or down for accurately positioning the ducts supported thereby with relation to the finished floor or partition surface.

A further object of this invention is to produce duct-supports which will hold the ducts in position safely against either upward or downward movement and to maintain the ducts permanently in the established position.

Still another object is to provide a duct-support having the above mentioned advantageous features which can be easily installed, with the minimum amount of labor.

A still further object of this invention concerns the provision of a duct support in which the ducts can be easily placed and fastened into place.

Another feature of this invention is the provision of a duct support, the principal elements of which may, preferably, be made of sheet metal, properly designed to enable their mass manufacture by the rapid and economical processes of machine stamping and bending.

Additional features and advantages of this invention will appear from the following description considered in connection with the accompanying drawing which forms a part of this application.

In the drawing:

Fig. 1 is a perspective view showing the base portion and the saddle portion of the support disconnected; the supporting bolts of the device being tilted inwardly to enable the insertion of their heads into the base.

Fig. 2 is a perspective view showing the duct-support fully assembled.

Fig. 3 is a perspective view showing a modified construction of the base portion of the duct-support.

Fig. 4 is a perspective view illustrating the method of installing the duct-supports and ducts carried thereby on the base of a floor, before the top finish is applied.

Fig. 5 is another perspective view showing the preliminary work required on a concrete floor base for installing the duct-supports.

Fig. 6 is also a perspective view showing the method of fastening the base of a duct support on a floor base built of hollow tile.

Fig. 7 is a perspective view of a so-called toggle-wire used for fastening the base of a duct-support on a hollow tile floor base, or other hollow partition.

In modern building construction it is the practice to install the underfloor system of ducts or conduits for electrical current distribution at a predetermined depth below the floor surface. Most systems in present use require that the ducts proper be located accurately with respect to the floor surface.

It has been customary in the past to hold the ducts up to proper position and to keep them from sagging by using blocks of wood, saddles of concrete or mortar, and other suitable and readily available materials. In other cases manufactured supports have been used which accomplish the same limited results.

This method of supporting the ducts has proved unsatisfactory in that difficulties have been experienced because, in the process of tamping-in the floor fill, the ducts or conduits owing to their buoyancy due to their size and relatively light weight, have a tendency to float in the semi-liquid and heavy concrete fill. Moreover, ducts so supported are easily displaced by careless workmen stumbling over them, or for some other reasons, unless securely fastened down as well as supported.

Duct-supports in present use are rather clumsy to handle, the adjustments are hard to make accurately and cannot be maintained permanently.

It is thought that the improved duct-supports forming the subject matter of this application overcome the above mentioned difficulties and present other valuable features, as will be hereafter fully described.

Reference being had to the various figures of the drawing, in which similar reference numerals designate corresponding parts throughout the several views, a duct-support built according to the preferred construction shown in Figures 1 and 2 comprises, mainly, a base portion 1 and a saddle portion 2 upon which the ducts or conduits are laid and which is secured to the base by means of the supporting bolts 3.

The base 1 is preferably made of pressed metal and comprises a flat body portion 4 the sides 5 of which are bent upwardly to afford greater rigidity. Both ends of the body are restricted to produce the necks 6 and are provided at the top with oppositely disposed and spaced holding lugs 7, the inner portions of which are cut away a sufficient amount to produce the bights 8 of sufficient size to freely accommodate the shanks 9 of the supporting bolts 3. The slots 10 provided at the outer ends of said necks are intended to permit passing therethrough any suitable flat instrument for cleaning out any foreign matter which might have collected in the necks. The latter are intended to receive the square heads of the supporting bolts and to prevent the same from turning or pulling up.

In the base of the body portion are provided two sets of holes, the central hole 11 being intended for any type of screw or bolt adapted to secure the base portion to a solid floor base, whereas the diagonally disposed holes 12 are used to secure the base to a floor base made of hollow tile, or the like, by inserting therethrough wires 30 at the lower ends of which are suspended anchors or toggles 31, Fig. 7.

The saddle of the duct-support is also made preferably of pressed sheet metal and has substantially the shape of a trough; it comprises a body portion 13 provided at both sides with the lateral stiffening ribs 14 the top edges of which are outwardly flared to produce the bearing flanges 15 which carry the ducts and also considerably increase the rigidity of the saddle.

The ends 16 of the bottom portion are also bent up and rise a considerable distance above the lateral ribs, to provide ample working room for the nuts of the supporting bolts and to provide maximum range of adjustment without the use of different length bolts. These ends terminate with the outwardly bent flat ears 17 in which are produced the apertures 18 which are engaged by the supporting bolts 3. These apertures are slightly larger than the diameter of said bolts to afford the necessary clearance for easily tilting the bolts into the position shown in Fig. 1.

The body portion of the saddle is sufficiently smaller than the body portion of the base so that the former may be nested partly within the latter for the purpose of affording the maximum range in vertical alignment of the ducts and to save space in packing. This construction also affords desirable minimum height for the supports.

In the middle of the bottom of the body portion of the saddle there is provided a dome-like protuberance 19 the purpose of which is to clear the head of the holding down bolt 29, which is inserted in the aperture 11 of the base portion. Another reason for this dome is to provide ample space, above the underside of the bottom of the saddle, for the duct binding wires 20 which are passed through suitable holes 21 produced in said dome, thereby allowing the bottom of the saddle to come in direct contact with the bottom of the base, when said parts are nested together closely. Holes 22 are provided in the ears for applying the additional binding wires 23 for the ducts.

As shown in the drawing, the middle portions of the lateral stiffening ribs 14 are raised by straightening up the bearing flanges 15, thus producing the spacer lugs 32 which serve to properly space and hold the two ducts, for which the saddle is designed.

The saddle is adjusted and maintained at the desired height above the base 1 by means of the bolt nuts 24 and 25 between which the ears of the saddle are clamped.

As stated above, the saddle illustrated in the drawing is intended for supporting two ducts or conduits disposed in parallel relation. However, it will be readily understood by those versed in this art that the construction could be very easily modified to accommodate but one duct or more than two ducts, according to the requirements of the trade, without in any way departing from the scope of this invention.

Where the floor base upon which the bases of the duct-supports are to be installed is perfectly level, or smooth, and it is desired to run the ducts or conduits all at a uniform level above said floor base, it may be found more expeditious and economical to adjust and rigidly fasten all the supporting bolts to the saddles on a work bench, rather than on the building floor, and to mount the so assembled parts on the bases previously installed on the floor base. In this case, the formerly described method of tilting the bolts is, of course, not applicable and the modified base shown in Fig. 3 is made use of.

As shown in this figure, this base differs from the one already described in that in one of the necks the bolt receiving bight opens outwardly, instead of inwardly, whereby it is possible to slide the assembled saddle-bolts from right to left (in the present case) home onto the base.

In the figure, the special neck is shown at the right hand side and designated by the numeral 26 and the bight thereof by the numeral 8ª. To facilitate the insertion of the head of the supporting bolt into this special neck, the latter is preferably provided with a flared extension 27, open at the end and having at the sides the ribs 5ª which are the prolongations of the lateral ribs of the body portion of the base. This special neck has also a slot 10ª which allows for the insertion of a flat tool for cleaning out the neck, prior to inserting the supporting bolt. Each clamping bolt has in this case, in addition to the two ear clamping nuts 24, 25, a third nut 28 by means of which the bolt may be rigidly fastened to the base. Alternately in place of using the nut 28, ribs 5ª may be distorted inwardly by a hammer blow to fasten the bolt 3 to the base. The same saddle, as shown in Figs. 1 and 2, is used in connection with this base, and it is but partly indicated in Fig. 3.

The method of installing an underfloor system of ducts with these improved duct-supports is very simple, and may be succinctly described as follows: Assuming that a system of ducts is to be placed in a floor, the run, or direction, of the various ducts is first established, by the so-called lay-out gang, by means of chalk lines 3 snaped on the floor base to temporarily define the line. Using these lines as guides, suitable holes are drilled at stated intervals in the floor base to receive the anchor bolts 29 or the toggle-wires 30, as the case may be, by means of which the bases of the duct-supports are fastened in correct position to the floor base. These bases are, by themselves, fully sufficient to definitely locate the run or position of the ducts.

The laying of the ducts proper may proceed immediately after locating the bases, or may be deferred until such a time as found desirable. Because of the absence of the interfering chalk lines, the placing of the ducts may be performed with great economy of time and more accurately.

While the illustrated and described examples constitute practical embodiments of this invention, it is nevertheless to be understood that minor changes may be made in the form, proportions and details of construction without departing from the spirit and scope of the invention as hereafter claimed.

What is claimed is:

1. In a duct-support, a base; a saddle; means for adjustably securing the saddle above and to said base; means for securing the base to a foundation; twistable means for removably securing to said saddle ducts or conduits carried thereby, and means for maintaining said ducts or conduits in proper spaced relation on the saddle.

2. In a duct-support, a base; a saddle and a plurality of bolts for adjustably securing the saddle above and to said base; said base having means at both ends thereof slidably engageable by the shanks of said bolts and adapted to hold the heads thereof against rotation.

3. In a duct-support, a base; a saddle; adjustable means for removably securing said saddle to the base, and means for securing the base to a foundation; said base having a within portion adapted to partly receive the saddle.

4. In a duct-support, a base having a hollow portion; a saddle partly nestable therein; a bolt positioned at each end of said support for adjustably securing the saddle above and to the base; and means positioned at both ends of the base slidably engageable by the shanks of said bolts and adapted to enclose the heads thereof against rotation and upward extraction.

5. In a duct-support, a substantially channel-shaped base; a saddle partly nestable therein; adjustable means for removably securing said saddle to the base; said base having two sets of apertures for selectively securing same to a foundation, one set consisting of a centrally disposed aperture adapted to receive a rigid securing means, and the other set comprising diagonally disposed apertures adapted to receive twistable securing means.

6. In a duct-support, a base having a hollow portion; a saddle partly nestable therein; a bolt positioned at each end of said support for adjustably securing the saddle above and to the base; holding-means positioned at both ends of the base and integral therewith slidably engageable by the shanks of said bolts and adapted to enclose the heads thereof against rotation and upward extraction, and means to limit the sliding movement of said bolts in said holding-means 7. In a duct-support, a substantially channel-shaped base; a trough-shaped saddle partly nestable therein, adjustable means for removably securing said saddle to the base, said base having a central aperture adapted to receive an anchoring bolt, and means positioned in the saddle to accommodate the head of said bolt.

8. In a duct-support, a substantially channel-shaped base having a central aperture adapted to receive an anchoring bolt; a trough-shaped saddle partly nestable in the base; bolt means for removably securing said saddle to the base; raised ears positioned at both ends of the saddle and having apertures engageable by said bolt means; the saddle having an inwardly directed depressed portion adapted to accommodate the head of said anchoring-bolt; said depressed portion and the ears of said saddle having apertures adapted to receive tying means for holding the ducts carried by the saddle.

9. In a duct-support, the combination of a substantially channel-shaped base; a trough-shaped duct-carrying saddle partly nestable in the base; adjustable means for removably securing the saddle to and above the base; and spacer means positioned on the saddle to hold the ducts carried thereby in fixed spaced relation.

10. In a duct-support, the combination of a substantially channel-shaped base, a trough-shaped duct-carrying saddle partly nestable in the base; adjustable means for removably securing the saddle to and above the base, and flanges formed on said saddle to increase the bearing surface for the ducts carried thereby.

11. A duct support comprising a one piece sheet metal cross saddle having an intermediate horizontal relatively low duct-supporting portion with vertically extending stiffening flange portions and with upwardly and outwardly inclined portions at the opposite ends thereof and laterally extending ear portions extending from said inclined portions, the intermediate portion of the said saddle constituting a duct seat, means for securing duct to said saddle on said seat portion, and means adjustably securing said saddle to a floor base, the last mentioned means comprising screws each extending through a corresponding one of said laterally extending ears of said saddle and anchoring means for connection to the floor base.

12. A duct support comprising, a one piece sheet metal cross saddle having an intermediate horizontal relatively low duct-supporting portion with vertically extending stiffening flange portions and with upwardly and outwardly inclined portions at the opposite ends thereof and laterally extending ear portions extending from said inclined portion, the intermediate portion of the said saddle constituting a duct seat, means for securing duct to said saddle on said seat portion, means adjustably securing said saddle to a floor base, the last mentioned means comprising adjusting screws each extending through a corresponding one of said laterally extending ears of said saddle and anchoring means for connection to the floor base, and means for locking the saddle in its adjusted position.

13. A one piece sheet metal duct supporting saddle provided with an intermediate duct seat portion, outwardly and upwardly inclined portions at the ends of said intermediate portion, both the intermediate portion and the inclined portions being provided with vertically extending stiffening ribs, and apertured laterally extending ear portions at the outer ends of the inclined portions.

14. A duct support comprising a shallow base member having end portions for securing saddle supporting devices, the saddle supporting devices detachably mounted in said end portions and extending vertically therefrom and a cross saddle adjustably connected at its opposite ends to said supporting devices, said cross saddle having a depressed duct seat portion between said supporting devices.

15. A duct support comprising a base member adapted to be secured to a foundation, a saddle member adjustably supported above said base and extending substantially parallel thereto, adjusting bolts provided with heads and connecting the ends of the saddle to the ends of the base, the base having neck portions for receiving the heads of said bolts, the said necks being constructed to prevent movement of the bolts in the direction of their length and to prevent rotation thereof.

16. A duct support comprising a base member adapted to be secured to a foundation, a duct supporting saddle member adjustably supported above said base and extending substantially parallel thereto, adjusting bolts provided with heads and connecting the ends of the saddle and the ends of the base, the said base being provided adjacent its ends with sockets into which the heads of the bolts may be inserted by movement laterally of the base, the said sockets having head engaging portions for preventing upward withdrawal of the bolts from the base and for preventing rotation of the bolt heads.

In testimony whereof we affix our signatures.

L ALAN SHARP.
JAMES M. G. FULLMAN.